(12) United States Patent
Kawahara et al.

(10) Patent No.: US 10,145,420 B2
(45) Date of Patent: Dec. 4, 2018

(54) JOINT STRUCTURE AND JOINING METHOD THEREOF

(71) Applicant: NSK LTD., Shinagawa-ku, Tokyo (JP)

(72) Inventors: Hiroshi Kawahara, Kanagawa (JP); Sumio Sugita, Kanagawa (JP)

(73) Assignee: NSK LTD., Tokyo (JP)

( * ) Notice: Subject to any disclaimer, the term of this patent is extended or adjusted under 35 U.S.C. 154(b) by 328 days.

(21) Appl. No.: 14/891,535

(22) PCT Filed: Dec. 19, 2013

(86) PCT No.: PCT/JP2013/007481
§ 371 (c)(1),
(2) Date: Nov. 16, 2015

(87) PCT Pub. No.: WO2014/184832
PCT Pub. Date: Nov. 20, 2014

(65) Prior Publication Data
US 2016/0089711 A1    Mar. 31, 2016

(30) Foreign Application Priority Data
May 17, 2013 (JP) .................... 2013-105499

(51) Int. Cl.
F16B 7/04 (2006.01)
F16B 17/00 (2006.01)
(Continued)

(52) U.S. Cl.
CPC .......... *F16D 1/072* (2013.01); *B21D 39/048* (2013.01); *F16B 7/0413* (2013.01);
(Continued)

(58) Field of Classification Search
CPC ... B21D 39/046; B21D 39/048; F16B 7/0406; F16B 7/0413; F16B 7/042; F16B 17/004;
(Continued)

(56) References Cited

U.S. PATENT DOCUMENTS 1,703,037 A * 2/1929 Heck ................. F16L 13/04
285/382.2
2,650,114 A * 8/1953 Epstein ................. F16L 37/02
285/382.2

(Continued)

FOREIGN PATENT DOCUMENTS

DE 10 2008 015 028 A1 9/2009
JP 63-154885 U 10/1988
(Continued)

OTHER PUBLICATIONS

International Search Report (PCT/ISA/210) issued in PCT Application No. PCT/JP2013/007481 dated Mar. 25, 2014 with English translation (Two (2) pages).
(Continued)

*Primary Examiner* — Josh Skroupa
(74) *Attorney, Agent, or Firm* — Crowell & Moring LLP (57) ABSTRACT

A joint structure includes a shaft member and a cylindrical member. The cylindrical member includes a plurality of first crimped portions crimped along a plurality of axial grooves provided in an axial direction of the shaft member, respectively, and a second crimped portion which fits the axial grooves and is crimped along a circumferential groove, the circumferential groove being provided on a circumferential surface of the shaft member by reducing a diameter of an axially intermediate portion of the cylindrical member in a radial direction. Each of the first crimped portions project from an inner circumferential surface of the cylindrical member as a projection. A position of a tip of the projection in an axis direction of the projection is set displaced from a position of a lowest point of the circumferential groove such that the tip is not located at the lowest point of the circumferential groove.

4 Claims, 8 Drawing Sheets

(51) Int. Cl.
*F16D 1/072* (2006.01)
*B21D 39/04* (2006.01)

(52) U.S. Cl.
CPC ........ *F16B 17/004* (2013.01); *F16D 2300/18* (2013.01); *Y10T 403/49* (2015.01); *Y10T 403/7073* (2015.01)

(58) Field of Classification Search
CPC .... F16D 1/072; F16D 1/0852; F16D 2300/18; F16L 13/14; F16L 13/141; F16L 33/2076; Y10T 403/49; Y10T 403/4991; Y10T 403/7062; Y10T 403/7073
USPC ........ 464/179, 182, 183; 403/274, 285, 373, 403/375; 285/382, 382.1, 382.25
See application file for complete search history.

(56) References Cited

U.S. PATENT DOCUMENTS

| | | | | |
|---|---|---|---|---|
| 3,642,311 A * | 2/1972 | Edgemond, Jr. | ........ | F16D 1/072 29/510 |
| 4,513,488 A * | 4/1985 | Arena | .................... | B21D 26/14 285/382.2 |
| 4,561,799 A | 12/1985 | Arena | | |
| 4,807,351 A * | 2/1989 | Berg | ....................... | F16D 1/072 29/419.2 |
| 4,902,048 A | 2/1990 | Washizu | | |
| 6,015,350 A * | 1/2000 | Breese | .................... | F16C 3/035 464/183 |
| 6,474,701 B1 * | 11/2002 | Bowles | ................. | F16L 13/141 285/382 |
| 8,997,877 B2 * | 4/2015 | Waldron | ............... | F16L 13/141 166/360 |

FOREIGN PATENT DOCUMENTS

| | | |
|---|---|---|
| JP | 11-248562 A | 9/1999 |
| JP | 2001-269740 A | 10/2001 |

OTHER PUBLICATIONS

Japanese-language Written Opinion (PCT/ISA/237) issued in PCT Application No. PCT/JP2013/007481 dated Mar. 25, 2014 (Three (3) pages).
Chinese-language Office Action issued in counterpart Chinese Application No. 201380003398.8 dated Aug. 10, 2015 (Three (3) pages).
International Preliminary Report on Patentability (PCT/IB/338 & PCT/IB/373) issued in PCT Application No. PCT/JP2013/007481 dated Nov. 26, 2015, including English translation of document C2 (Japanese-language Written Opinion (PCT/ISA/237)) previously filed on Nov. 16, 2015 (Five (5) pages).
European Search Report issued in counterpart European Application No. 13884924.5 dated Apr. 12, 2017 (eight pages).

* cited by examiner

Prior Art

FIG. 14

Prior Art

FIG. 15

Prior Art

JOINT STRUCTURE AND JOINING METHOD THEREOF

TECHNICAL FIELD

The present disclosure relates to a joint structure and a joining method thereof, and particularly, relates to a joint structure formed by crimping joint of a shaft member and a cylindrical member used for a torque sensor, and to a joining method thereof.

BACKGROUND ART

Heretofore, a torque sensor described in Patent Literature 1 has been mentioned as a technique concerning a joint structure, which fits a cylindrical member to a shaft member such as a solid shaft or a hollow shaft, and crimps the cylindrical member to then fix the cylindrical member to the shaft member.

Figure 13:
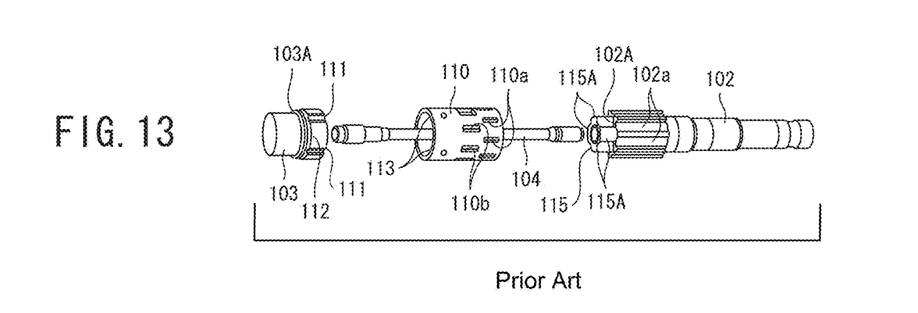
FIG. 13 is a perspective view illustrating a configuration in a conventional joint structure.

As illustrated in FIG. 13, in the torque sensor of Patent Literature 1, plural axial grooves 111 extending in an axial direction and a circumferential groove 112 continuous in a circumferential direction are formed on an outer circumferential surface of a large-diameter portion 103A of an end portion of an output shaft 103.

The axial grooves 111 are formed over both end portions of the large-diameter portion 103A. The circumferential groove 112 is formed near a position where an end portion of a cylindrical member 110 is located when the cylindrical member 110 is fixed.

Plural hemispherical projections 113 are formed on positions slightly protruding from a lower end portion of an inner circumferential surface of the cylindrical member 110. The number and the forming position of the projections 113 correspond to those of axial grooves 111. The height of the projections 113 is equal to the depth of the axial grooves 111.

In fixing the cylindrical member 110 to the large-diameter portion 103A, the projections 113 are fitted into the axial grooves 111 to position the cylindrical member 110 in the circumferential direction with respect to the output shaft 103. Next, the cylindrical member 110 is pushed such that the end portion of the cylindrical member 110 comes close to the circumferential groove 112. In such a state, the end portion of the cylindrical member 110 is crimped inwardly so as to bite into the circumferential groove 112.

As described above, in the technique described in Patent Literature 1, the projections provided on the cylindrical member are fit into the grooves provided on the shaft member to prevent displacement in a rotational direction.

CITATION LIST

Patent Literature

PTL 1: JP H11-248562 A

SUMMARY OF INVENTION

Technical Problem

The torque sensor described in Patent Literature 1, however, has room for improvement in following points (1) to (4).

(1) In fitting the projections provided beforehand on the cylindrical member to the axial grooves, a problem such as a gap between the fitted portions or scraping of the projections may occur depending on working accuracy of the projections and the axial grooves. In a combination in which, for example, a diameter of a circle inscribed to the projections is lager than a diameter of the bottom of the groove, looseness may occur in the rotational direction.

(2) When the projection is formed by deformation processing, springback results in a shear drop at the foot of the projection and the shear drop may interfere a groove shoulder. When the cylindrical member is inserted into the shaft member in such a state, the projection of the cylindrical member is scraped, and thus contamination is caused and may result in a problem.

(3) In matching the tip of the projection of the cylindrical member with the bottom of the groove and fitting them to each other, when the projection comes into contact with the groove at one point of the bottom of the groove, rigidity in the rotational direction is low. Thus, such a contact is not sufficient as a rotation stopper in a mode in which an external force is applied to the cylindrical member in the worst case.

(4) Since the inner diameter of the projections is fitted into the bottom of the groove, the diameter of the circle inscribed to the projections may affect the assembly accuracy of the cylindrical member. For example, when the coaxial degree between the circle inscribed to the projections formed by deformation processing and the cylindrical member is not sufficient, the cylindrical member may be eccentric relative to the shaft member.

In this connection, the present disclosure has been made by focusing on the problem mentioned above, and it is an object of the present disclosure to provide a joint structure capable of suitably joining the members which compose the joint structure, and to provide a joining method thereof.

Solution to Problem

An embodiment of a joint structure for achieving the above-described object includes: a shaft member; and a cylindrical member, an inner surface of which is fitted to an outer surface of the shaft member.

The cylindrical member including: a plurality of first crimped portions which are crimped along a plurality of axial grooves provided in an axial direction of the shaft member, respectively; and a second crimped portion which fits the axial grooves and is crimped along a circumferential groove, the circumferential groove being provided on a circumferential surface of the shaft member by reducing a diameter of an axially intermediate portion of the cylindrical member in a radial direction.

Herein, each of the first crimped portions of the joint structure may have a shape projecting from the inner circumferential surface of the cylindrical member as a spherical projection.

Furthermore, in the joint structure, a position of a tip in the axis direction of the spherical projection may be laid out within a predetermined range on a side surface side of the circumferential groove.

Furthermore, in the joint structure, a diameter of a circle inscribed to the first crimped portions may be set lager in cross section than a curvature radius of a bottom portion in a circumferential direction of each of the axial grooves.

Furthermore, in the joint structure, the axial groove may be have a bathtub-shaped cross-section in the circumferential direction.

Furthermore, an embodiment of a joining method of a joint structure, includes:

a provisional first crimped portion forming step for forming a plurality of projections on an inner circumferential surface of a cylindrical member such that the plurality of projections are engaged with a plurality of axial grooves provided on a shaft member, respectively;

fitting the shaft member to the cylindrical member such that an outer surface of the shaft member comes into contact with the inner surface of the cylindrical member, and such that the projections on the inner circumferential surface of the cylindrical member engage with the plurality of axial grooves provided on the shaft member and a circumferential groove provided on a circumferential surface of the shaft member; and a crimped portion forming step for forming first crimped portions and a second crimped portion which is connected the first crimped portions and crimped along the circumferential groove at the same time by laying out a tip in an axis direction of each of the plurality of the projections of respective provisional first crimped portions within a predetermined range on a side surface side of the circumferential groove, and by reducing a diameter of the cylindrical member along the circumferential groove provided on the circumferential surface of the shaft member.

Furthermore, another embodiment of a joining method of a joint structure, includes:

a provisional first crimped portion forming step for forming a plurality of projections on an inner circumferential surface of a cylindrical member such that the plurality of projections are engaged with a plurality of axial grooves provided on a shaft member, respectively;

fitting the shaft member to the cylindrical member such that an outer surface of the shaft member comes into contact with the inner surface of the cylindrical member, and such that the plurality of axial grooves provided on the shaft member engage with the projections on the inner circumferential surface of the cylindrical member; and a first crimped portion forming step for forming first crimped portions by deforming provisional first crimped portions along the axial grooves of the shaft member; and a second crimped portion forming step for forming a second crimped portion which is connected the first crimped portions and crimped along a circumferential groove provided on a circumferential surface of the shaft member by reducing a diameter of an axially intermediate portion of the cylindrical member in a radial direction.

Herein, in the joining methods of the joint structure, each of the first crimped portions may have a shape projecting from the inner circumferential surface of the cylindrical member as a spherical projection.

Furthermore, in the joining methods of the joint structure, a diameter of a circle inscribed to the first crimped portions may be set lager in cross section than a curvature radius of a bottom portion in a circumferential direction of each of the axial grooves.

Furthermore, in the joining methods of the joint structure, the axial groove may be have a bathtub-shaped cross-section in the circumferential direction.

Advantageous Effects of Invention

According to the present disclosure, it is possible to provide a joint structure capable of suitably joining the members which compose the joint structure, and to provide a joining method thereof.

BRIEF DESCRIPTION OF DRAWINGS

FIGS. 6A and 6B are partial cross-sectional views of the main portion in the first crimped portion forming step in the certain embodiment of the joining method of the joint structure, in which FIG. 6A illustrates the state before the first crimped portion forming step, and FIG. 6B illustrates the state after the first crimped portion forming step;

FIGS. 7A and 7B are perspective views illustrating states in the second crimped portion forming step in the certain embodiment of the joining method of the joint structure, in which FIG. 7A illustrates the state before the second crimped portion forming step, and FIG. 7B illustrates the state after the second crimped portion forming step;

FIGS. 10A and 10B are perspective views illustrating states in the second crimped portion forming step in the other embodiment of the joint structure and the joining method, in which FIG. 10A illustrates the state before the second crimped portion forming step, and FIG. 10B illustrates the state after the second crimped portion forming step;

FIGS. 11A to 11D are photographs of the cylindrical member in the other embodiment of the joint structure and the joining method, in which FIGS. 11A to 11C are photographs of an outer diameter of the cylindrical member on which a projection is formed, with the advance of crimping by reducing the diameter, viewed from directly above, and FIG. 11D is a photograph of the state of the projection on the inner diameter side of the cylindrical member after the crimping by reducing the diameter;

DESCRIPTION OF EMBODIMENTS

A description is made below of embodiments of a joint structure according to the present disclosure and a joining method thereof with reference to the drawings.

(Joint Structure)

Figure 1:
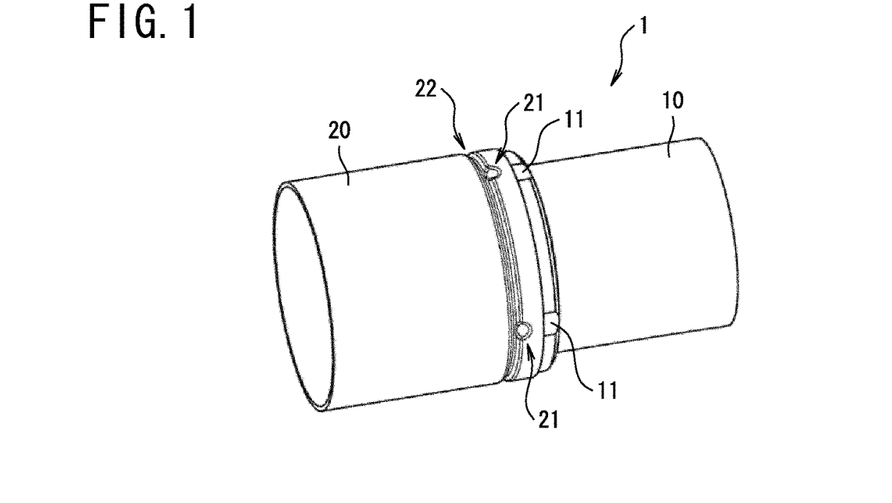
FIG. 1 is a perspective view illustrating a configuration in a certain embodiment of a joint structure.
Figure 2:
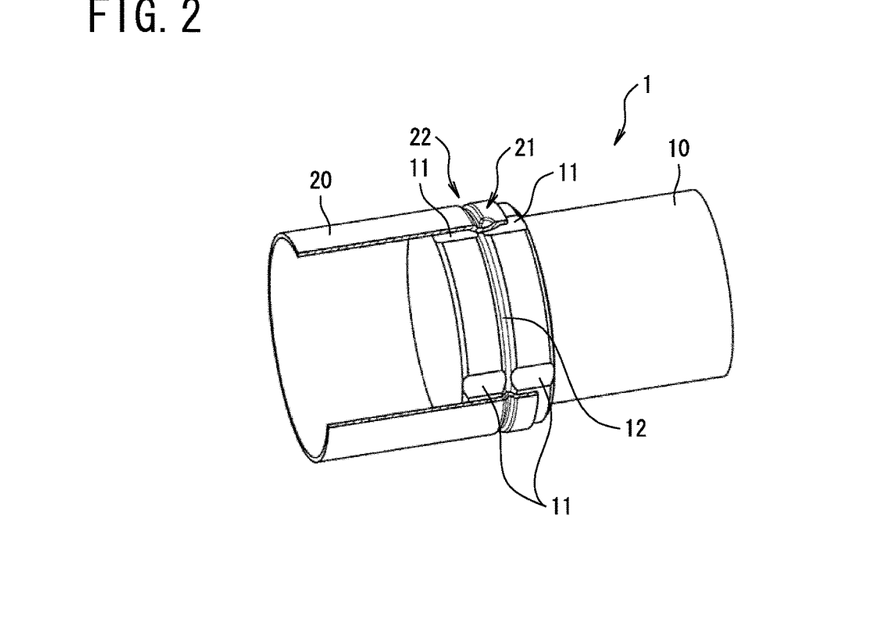
FIG. 2 is a partial cross-sectional view illustrating the configuration in the certain embodiment of the joint structure.
Figure 3:
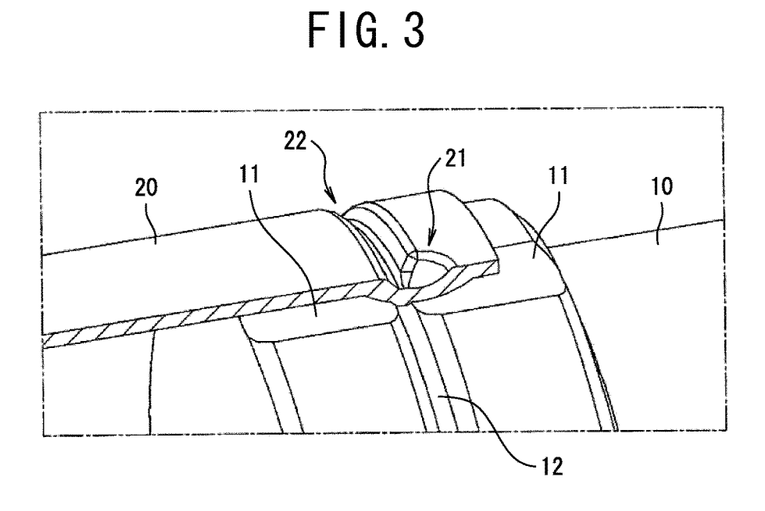
FIG. 3 is a partial cross-sectional view of a main portion, illustrating the configuration in the certain embodiment of the joint structure.
Figure 4:
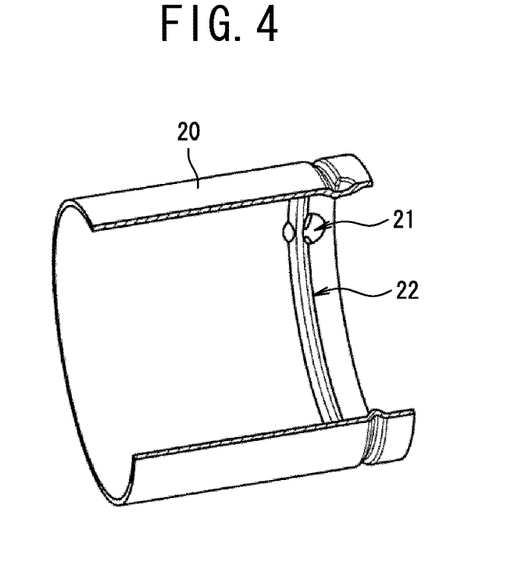
FIG. 4 is a partial cross-sectional view illustrating a configuration of a cylindrical member in the certain embodiment of the joint structure.

FIG. 1 is a perspective view illustrating a configuration in a certain embodiment of a joint structure according to the present disclosure. Furthermore, FIG. 2 is a partial cross-sectional view illustrating the configuration in the certain embodiment of the joint structure according to the present disclosure. Furthermore, FIG. 3 is a partial cross-sectional view of a main portion, illustrating the configuration in the certain embodiment of the joint structure according to the present disclosure. Furthermore, FIG. 4 is a partial cross-sectional view illustrating a configuration of a cylindrical member in the certain embodiment of the joint structure according to the present disclosure. It is to be noted that FIG. 4 is expressed by omitting a shaft member from FIG. 1 and FIG. 2.

As illustrated in FIG. 1 to FIG. 4, a joint structure 1 of the present embodiment includes a shaft member 10 and a cylindrical member 20 having an inner circumferential surface fitted to an outer circumferential surface of the shaft member 10.

Plural axial grooves 11 are provided on a circumferential surface of the shaft member 10 in an axial direction. Furthermore, a circumferential groove 12 is provided over whole periphery of the circumferential surface of the shaft member 10.

The cylindrical member 20 includes plural first crimped portions 21 crimped along the plural axial grooves 11, respectively, and a second crimped portion 22 being fitted to the axial grooves 11 and crimped along the circumferential groove 12 of the shaft member 10 by reducing a diameter of an axially intermediate portion in a radial direction. In the present embodiment, the second crimped portion 22 is provided over whole periphery of the circumferential surface of the cylindrical member 20.

That is, the first crimped portions 21 are provided on intersections between the axial grooves 11 and the circumferential groove 12, and the second crimped portion 22 is formed on the first crimped portions 21 by reducing the diameter of the cylindrical member 20. Specifically, as illustrated in FIG. 4, a projection projecting from the inner circumferential surface of the cylindrical member 20 inwardly (hereinafter, also simply referred to as projection) is deformed by being crimped such that the side surface shape of the axial groove 11 is transferred thereto.

Furthermore, as illustrated in FIG. 4, it is preferable that the first crimped portion 21 have a shape projecting from the inner circumferential surface of the cylindrical member 20 as a spherical projection.

Furthermore, it is preferable that a diameter of a circle inscribed to the first crimped portions 21 be set larger than the curvature radius of a bottom portion in a cross section in a circumferential direction of the axial groove 11.

(Joining Method of Joint Structure)

Next, a description is made of a joining method of the joint structure shown in FIG. 1 to FIG. 4.

Figure 5:
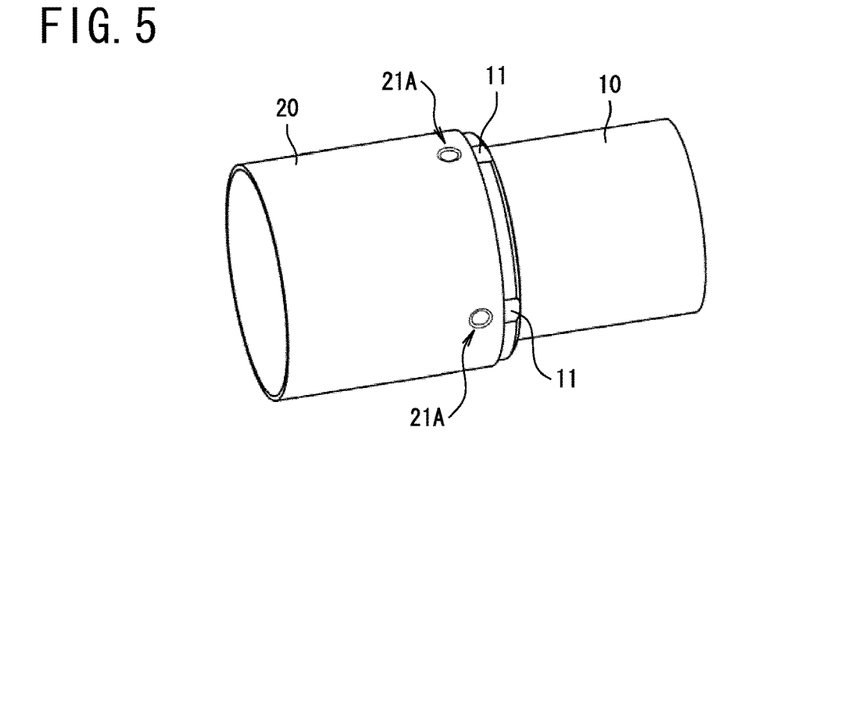
FIG. 5 is a partial cross-sectional view illustrating a state before a first crimped portion forming step in the certain embodiment of a joining method of the joint structure.
Figure 6A:
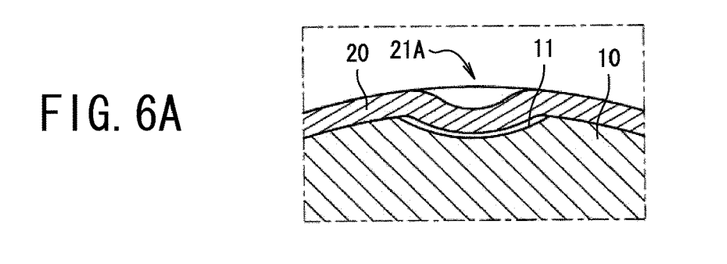
Figure 6B:
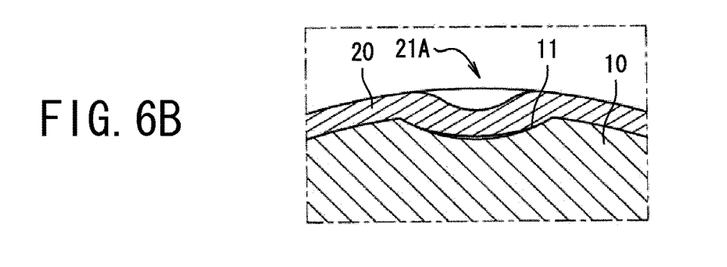

FIG. 5 is a partial cross-sectional view illustrating a state before a first crimped portion forming step in the certain embodiment of the joining method of the joint structure. Furthermore, FIGS. 6A and 6B are partial cross-sectional views of the main portion in the first crimped portion forming step in the certain embodiment of the joining method of the joint structure, in which FIG. 6A illustrates the state before the first crimped portion forming step, and FIG. 6B illustrates the state after the first crimped portion forming step.

Figure 7A:
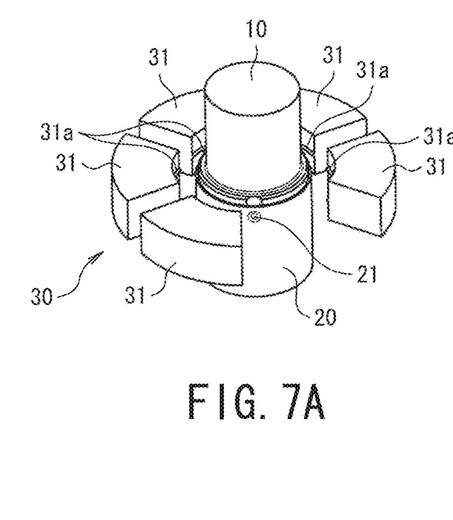
Figure 7B:
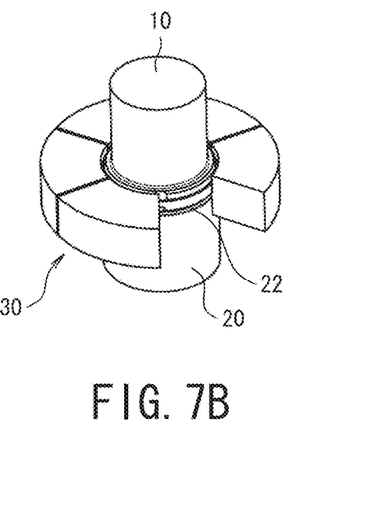
Figure 8:
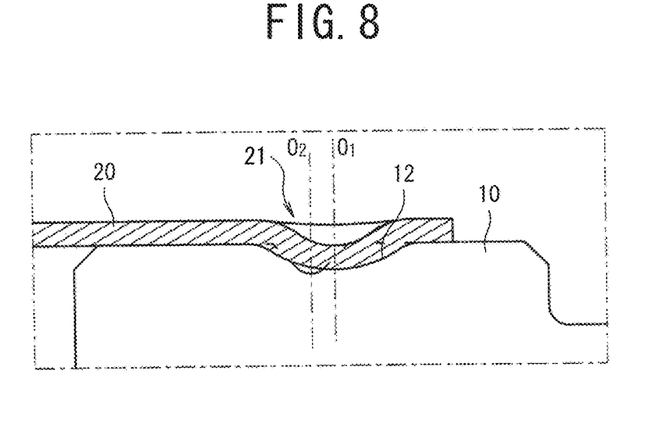
FIG. 8 is a partial cross-sectional view of the main portion, illustrating a state after the second crimped portion forming step in the certain embodiment of the joining method of the joint structure.

Furthermore, FIGS. 7A and 7B are perspective views illustrating states in the second crimped portion forming step in the certain embodiment of the joining method of the joint structure, in which FIG. 7A illustrates the state before the second crimped portion forming step, and FIG. 7B illustrates the state after the second crimped portion forming step. Furthermore, FIG. 8 is a partial cross-sectional view of the main portion illustrating a state after the second crimped portion forming step in the certain embodiment of the joining method of the joint structure.

The joining method of the joint structure of the present embodiment includes a provisional first crimped portion forming step of forming a provisional first crimped portion 21A (see FIG. 5) on the cylindrical member 20, and a first crimped portion forming step and a second crimped portion forming step after fitting the shaft member 10 and the cylindrical member 20 while bringing the outer surface of the shaft member 10 into contact with the inner surface of the cylindrical member 20 and engaging the provisional first crimped portion 21A with the axial groove 11.

(Provisional First Crimped Portion Forming Step)

The provisional first crimped portion forming step is a step of forming plural projections on the inner circumferential surface of the cylindrical member 20 such that these projections is engaged with the plural axial grooves 11 provided on the shaft member 10, respectively. It is to be noted that the provisional first crimped portions 21A are projections that are provided beforehand at positions where the first crimped portions 21 are to be provided on the outer circumferential surface of the cylindrical member 20 and project from the inner circumferential surface of the cylindrical member 20. That is, the cylindrical member 20 is fitted to the shaft member 10 while engaging the projects of the provisional first crimped portions 21A with the axial grooves 11.

(First Crimped Portion Forming Step)

Furthermore, as illustrated in FIGS. 6A and 6B, the first crimped portion forming step is a step of forming the first crimped portions 21 by further crimping the provisional first crimped portions 21A in a state in which the positions of the provisional first crimped portions 21A provided on the cylindrical member 20 in the provisional first crimped portion forming step are matched to a position where the second crimped portion is to be formed in the second crimped portion forming step described below.

Figure 14:
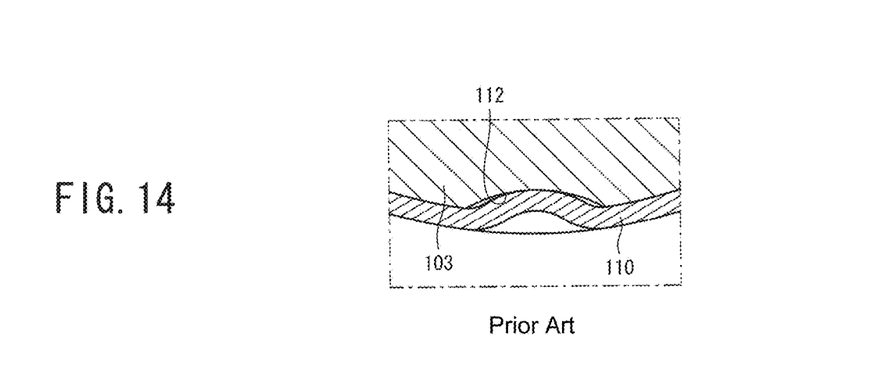
FIG. 14 is a partial cross-sectional view of the main portion illustrating the configuration in the conventional joint structure.

Herein, a description is made of a relationship between the diameter of the circle inscribed to the projections of the provisional first crimped portions, projecting from the from the inner circumferential surface of the cylindrical member and the curvature radius of the bottom portion in the cross section in the circumferential direction of the axial grooves. FIG. 14 is a cross-sectional view of the main portion illustrating a fitting state in a case in which the cylindrical member is crimped and fixed to the shaft member having axial grooves and the cross-sectional shape of the axial grooves in the circumferential direction is a single circular arc.

In the aspect illustrated in FIG. 14, since the projection comes into contact with the axial groove only at the tip of the projection (also at the bottom of the groove), there is no rigidity in the rotational direction. Thus, the function as a rotation stopper is not sufficient. This applies to not only the case in which the cross-sectional shape of the axial grooves is a single circular arc but also any case in which the cylindrical member is fitted to the shaft member at the tip of the projection.

Figure 15:
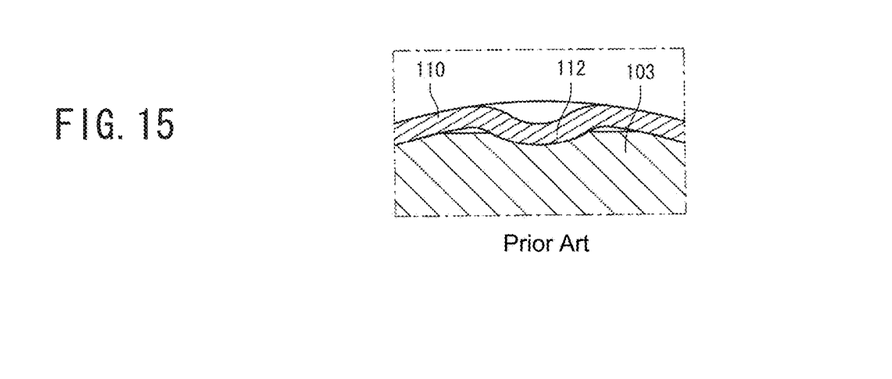
FIG. 15 is a partial cross-sectional view of the main portion illustrating the configuration in the conventional joint structure.

Furthermore, FIG. 15 is a cross-sectional view of the main portion illustrating a fitting state in a case in which the cylindrical member is crimped when the diameter of the circle inscribed to the projections of the provisional first crimped portions, projecting from the inner circumferential surface of the cylindrical member is substantially equal to the curvature radius of the bottom portion in the cross section in the circumferential direction of the axial grooves.

In the aspect illustrated in FIG. 15, the rigidity in the rotational direction can be obtained, however, the shoulder portion of the axial groove is more likely to damage the projection due to a phase shift in assembling.

Furthermore, when the projection is formed on the cylindrical member 20 by deformation processing, springback may result in a shear drop at the foot of the projection. In order to avoid these problems, it is necessary to provide a grinding undercut at the shoulder portion of the axial groove, and thus, the fitting depth between the axial groove and the projection becomes shallower.

Therefore, in the present embodiment, the diameter of the circle inscribed to the projections of the provisional first crimped portions 21A provided on the cylindrical member 20 beforehand, projecting from the inner circumferential surface of the cylindrical member 20 is set lager than the curvature radius of the bottom portion in the cross section in the circumferential direction of the axial grooves 11 of the shaft member 10. That is, in the state illustrated in FIG. 6A (before the first crimped portion forming step), there is a gap between the projection of the provisional first crimped portion 21A provided on the cylindrical member 20 beforehand, projecting from the inner circumferential surface of the cylindrical member 20 and the axial groove. Therefore, the axial groove 11 does not scrape off the projection of the provisional first crimped portion 21A in an assembling step. Furthermore, as the projection does not come into contact with the shaft member 10, the working accuracy of the projection does not affect assembling accuracy.

Then, with the advance of crimping the provisional first crimped portion 21A in the first crimped portion forming step, as illustrated in FIG. 6B, the projection projecting from inner circumferential surface of the cylindrical member 20 is deformed toward the axial groove 11 to come into contact with the axial groove 11. It is to be noted that the diameter of the circle inscribed to the projections of the first crimped portions 21, projecting from the inner circumferential surface of the cylindrical member 20 is still lager than the curvature radius of the bottom portion in the cross section in the circumferential direction of the axial grooves 11 also after the first crimped portion forming step.

By such a configuration, it is possible to stably ensure a rotation stopping function regardless of a dimensional relation between the projection and the axial groove 11.

(Second Crimped Portion Forming Step)

As illustrated in FIGS. 7A and 7B, the second crimped portion forming step is a step of crimping the cylindrical member 20 along the circumferential groove 12 of the shaft member 10 by reducing a diameter of an axially intermediate portion of the cylindrical member 20 in a radial direction by using a die 30, the cylindrical member 20 being fitted to the shaft member 10 to form the second crimped portion 22. It is to be noted that, in the second crimped portion forming step, the second crimped portion 22 is formed so as to be connected to the first crimped portion.

The die 30 includes plural approximately fan-shaped divided bodies 31 combined in the circumferential directions to form a circular ring-shape. Each divided body 31 has an inner circumferential surface having a shape capable of coming into contact with the outer diameter of the cylindrical member 20. The divided body 31, as illustrated in FIGS. 7A and 7B for example, has a shape obtained by dividing the circular ring-shaped die 30 into six pieces. It is to be noted that, in FIGS. 7A and 7B, representation of one divided body 31 is omitted.

Each divided body 31 has a protruding portion 31a on the inner circumferential surface thereof for pushing the cylindrical member 20 to the circumferential groove 12 to forming the second crimped portion 22.

In the second crimped portion forming step, first, as illustrated in FIG. 7A, the die 30 is arranged to surround the cylindrical member 20 after the first crimped portion forming step on the outer circumferential surface side.

Next, as illustrated in FIG. 7B, the respective divided body 31a are pushed in synchronization with one another by using an apparatus (not illustrated) of synchronizing the respective divided body 31a with one another so as to push the respective divided body 31a toward the axis line of the die 30. As a result, the diameter of the cylindrical member 20 is reduced in the radial direction to form the second crimped portion 22 which is connected to the first crimped portions 21 and crimped along the circumferential groove 12.

Herein, in the second crimped portion forming step, as illustrated in FIG. 8, it is preferable that the position O1 in the axis direction of the tip of the projection of the first crimped portion 21, projecting from the inner circumferential surface of the cylindrical member 20 be set to be displaced from the position O2 of the lowest point of the circumferential groove 12. This is because when the position O1 in the axis direction of the tip of the projection is located at the position O2 of the lowest point of the circumferential groove 12, an engaging amount between the axial groove 11 and the projection may become small, and thus, desired rigidity may be hardly obtained. On the other hand, when an offset amount between the projection and the circumferential groove 12 is too large, deformation of the projection by crimping becomes insufficient, and thus the projection does not exhibit a function as a rotation stopper.

For these reasons, it is preferable to lay out the position O1 of the tip in the axis direction of the projection within a predetermined range on the side surface side of the circumferential groove 12.

It is to be noted that, in FIG. 8, by laying out the projection not only as "the projection of the second crimped portion 22" but also as a projection of the provisional first crimped portion 21A, and reducing the diameter of the cylindrical member 20 along the circumferential groove 12, the first crimped portion 21 and the second crimped portion 22 which is connected to the first crimped portion 21 and crimped along the first crimped portion 21 can be formed at the same time. The step of performing the first crimped portion forming step and the second crimped portion forming step at the same time is referred to as a crimped portion forming step.

(Other Embodiments)

Figure 9:
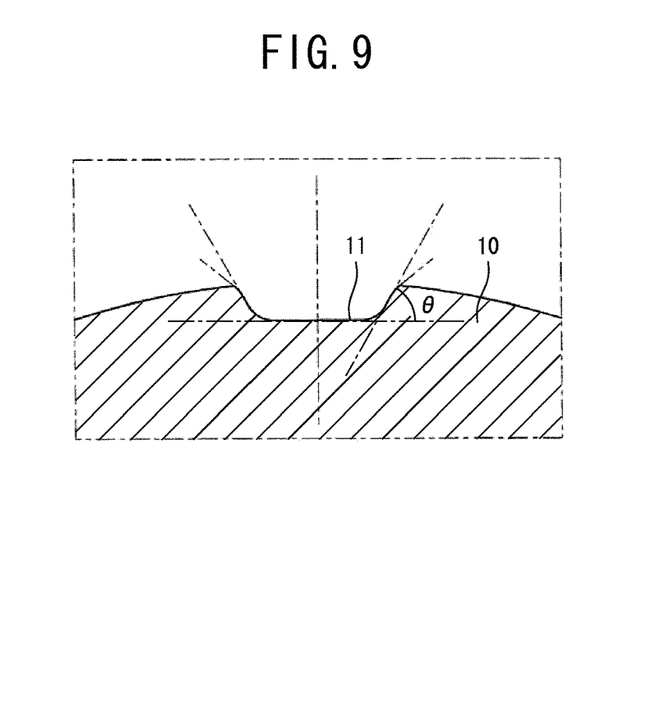
FIG. 9 is a cross-sectional view illustrating a configuration of a circumferential groove in another embodiment of the joint structure and the joining method.
Figure 10A:
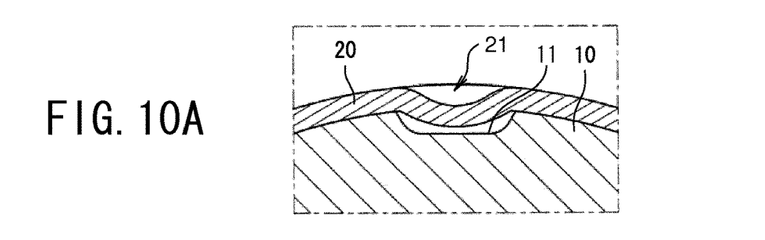
Figure 10B:
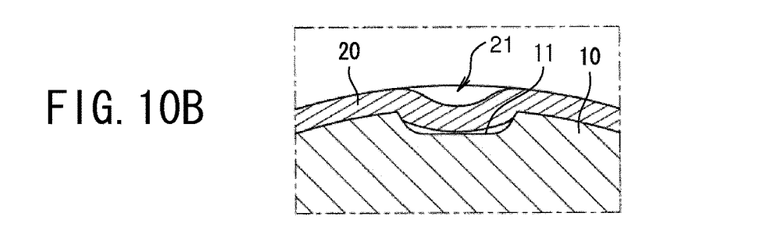

FIG. 9 is a cross-sectional view illustrating a configuration of the axial groove in another embodiment of the joint structure and the joining method. Furthermore, FIGS. 10A and 10B are perspective views illustrating states in the second crimped portion forming step in the other embodiment of the joint structure and the joining method, in which FIG. 10A illustrates the state before the second crimped portion forming step, and FIG. 10B illustrates the state after the second crimped portion forming step. It is to be noted that, in the description of the present embodiment, a description of a duplicate configuration with that of the above-mentioned embodiment is omitted.

As illustrated in FIGS. 9, 10A, and 10B, in the present embodiment, the axial grooves 11 of the shaft member 10 have a bathtub-shaped cross-section in the circumferential direction. Such a shape makes the projection come into contact with the both side surfaces of the axial groove 11 to obtain rigidity in the rotational direction. It is to be noted that, as illustrated in FIGS. 9, 10A, and 10B, a flat portion is provided on the bottom portion of the axial groove 11, and the both sides of the flat portion rise at 60 degrees.

Furthermore, the open width of the axial groove 11 is designed to be wider than the width of the foot of the projection. Thus, the dimensional relation is designed such that the shoulder portion of the axial groove 11 and the projection do not interfere with each other at the time of assembling.

Furthermore, it is preferable that the axial groove 11 be worked by cold forging work, and that the shaft member 10 be formed by performing a machining process on the cold forged product. At this time, when the side surface of the axial groove 11 linearly rises toward the outer diameter of the shaft member 10, burrs may be generated when the outer circumferential surface is machined and may come into contact with the projection. In order to avoid this, it is preferable that the both side surfaces of the axial groove 11 have a shape that opens outward in the vicinity of the outer circumferential surface of the shaft member 10.

Figure 11A:
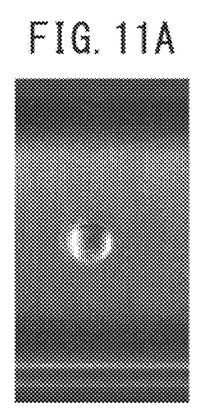
Figure 11B:
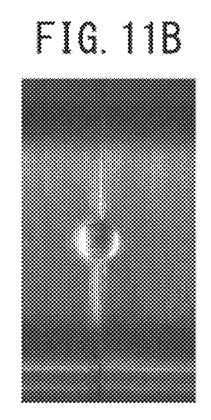
Figure 11C:
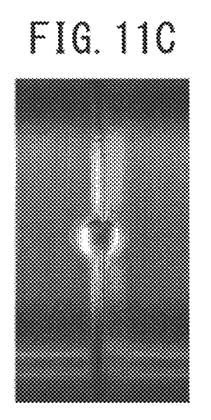
Figure 11D:
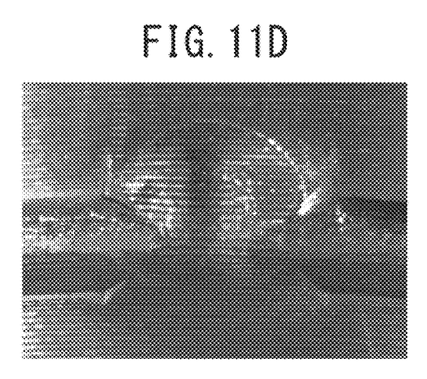

Herein, photographs of the cylindrical member 20 of the present embodiment illustrated in FIGS. 9, 10A, and 10B are represented in FIGS. 11A to 11D. FIGS. 11A to 11C are photographs of the projection viewed from directly above on the outer diameter side of the cylindrical member 20. These photographs represent an aspect in which the crimping by reducing the diameter progresses in the order of FIGS. 11A, 11B, and 11C. Furthermore, FIG. 11D is a photograph of the state of the projection on the inner diameter side of the cylindrical member 20 after the crimping by reducing the diameter. In the photograph, it can be confirmed that the side surface shape of the axial groove 11 is transferred to the both side surface of the projection. As illustrated in FIGS. 11A to 11D, it is found that the contact between the projection and the side surface of the axial groove 11 allows joining without looseness in the rotational direction.

Figure 12A:
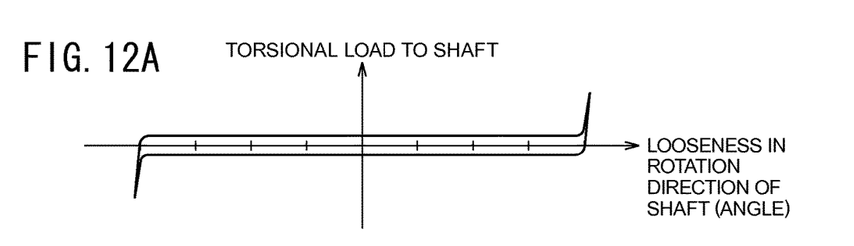
FIGS. 12A to 12C are graphs illustrating a rotation stopping effect of the projection in the other embodiment of the joint structure and the joining method, a torque applied to the joined portion of the shaft member and the cylindrical member is illustrated on a vertical axis, and a relative angle between the shaft member and the cylindrical member is shown on a horizontal axis.
Figure 12B:
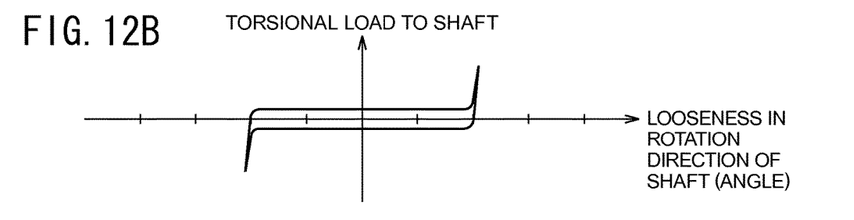
Figure 12C:
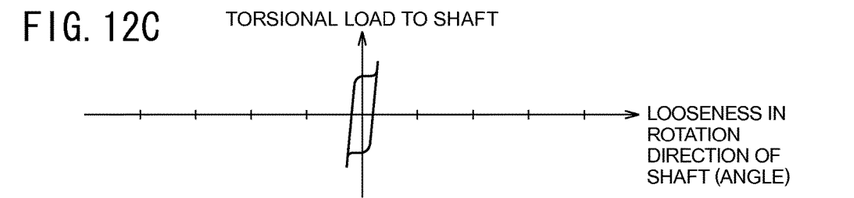

Furthermore, FIGS. 12A to 12C are graphs illustrating a rotation stopping effect of the projection, in which a torque applied to the joined portion of the shaft member 10 and the cylindrical member 20 is illustrated on a vertical axis, and a relative angle between the shaft member 10 and the cylindrical member 20 is shown on a horizontal axis. It is to be noted that the rises of the torque at the both ends in each diagram indicate points where the torque rises since the projection comes into contact with the side surface of the axial groove 11. It is to be noted that FIGS. 12A to 12C illustrate measurement results in the respective states illustrated in FIGS. 11A to 11C, respectively, and indicate the relationship between the progress of the crimping by reducing the diameter and the looseness in the rotational direction. As illustrated in FIGS. 12A to 12C, it can be confirmed that as the crimping by reducing the diameter progresses and the projection comes into contact with the side surface of the axial groove 11, the looseness in the rotational direction becomes smaller.

As described above, according to the certain embodiment of the present disclosure, the first crimped portion formed on the cylindrical member 20 is deformed to be pushed to the axial groove 11 with the crimping of the cylindrical member 20 in the second crimped portion forming step, and given a function of the rotation stopper as a result.

Furthermore, in the configuration of the present embodiment, since the projection and the axial groove 11 have a relationship in which there is completely a gap therebetween at the time of assembling, it is not need to worry about the scraping of the projection and an influence on the assembling accuracy described above. Furthermore, since the first crimped portion is provided on the intersection between the axial groove 11 and the circumferential groove 12, the projection is deformed toward the axial groove 11 with crimping of the cylindrical member 20 by reducing the diameter. Thus, there is no gap between the projection and the axial groove 11 after crimping (after the second crimped portion forming step), the projection exhibits a function as a rotation stopper.

Therefore, it is possible to provide a joint structure capable of suitably joining the shaft member and the cylindrical member which compose the joint structure, and to provide a joining method thereof.

As above, the description has been made of the joint structure and the joining method thereof. However, the joint structure according to the present disclosure and the joining method thereof are not limited to the above-described embodiments, and are modifiable in various ways without departing from the spirit of the present invention. For example, detailed conditions such as the shapes and the numbers of the axial groove and the circumferential groove, and the shapes and the numbers of the first crimped portion and the second crimped portion are alterable within a range where the functions of the present invention are exhibited.

REFERENCE SIGNS LIST 1 joint structure
10 shaft member
11 axial groove
12 circumferential groove
20 cylindrical member
21 first crimped portion (spherical projection)
22 second crimped portion

The invention claimed is:
1. A joint structure comprising:
a shaft member; and
a cylindrical member, an inner surface of which is fitted to an outer surface of the shaft member, the cylindrical member including:
a plurality of first crimped portions which are crimped along a plurality of axial grooves provided in an axial direction of the shaft member, respectively; and
a second crimped portion which fits the axial grooves and is crimped along a circumferential groove, the circumferential groove being provided on a circumferential surface of the shaft member by reducing a diameter of an axially intermediate portion of the cylindrical member in a radial direction;
wherein each of the first crimped portions project from an inner circumferential surface of the cylindrical member as a projection;
wherein a position of a tip of the projection in an axis direction of the projection is set displaced from a position of a lowest point of the circumferential groove such that the tip of the projection is not located at the lowest point of the circumferential groove.

2. The joint structure according to claim 1, wherein each of the first crimped portions has a shape of a spherical projection.

3. The joint structure according to claim 1, wherein a diameter of a circle inscribed to the first crimped portions is set larger in cross section than a curvature radius of a bottom portion in a circumferential direction of each of the plurality of axial grooves.

4. The joint structure according to claim 1, wherein a flat portion is provided on a bottom portion of the axial grooves and wherein both sides of the flat portion rise.

\* \* \* \* \*